(12) United States Patent
Omori

(10) Patent No.: US 11,795,996 B2
(45) Date of Patent: Oct. 24, 2023

(54) THRUST FOIL BEARING, AND METHOD FOR MANUFACTURING BASE PLATE OF THRUST FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 148 days.

(21) Appl. No.: 17/404,554

(22) Filed: Aug. 17, 2021

(65) Prior Publication Data

US 2021/0372465 A1  Dec. 2, 2021

Related U.S. Application Data

(63) Continuation of application No. PCT/JP2020/006075, filed on Feb. 17, 2020.

(30) Foreign Application Priority Data

Feb. 22, 2019 (JP) .................................. 2019-030418

(51) Int. Cl.
*F16C 17/04* (2006.01)

(52) U.S. Cl.
CPC ........ *F16C 17/042* (2013.01); *F16C 2220/40* (2013.01)

(58) Field of Classification Search
CPC .................................................. F16C 17/042
See application file for complete search history.

(56) References Cited

U.S. PATENT DOCUMENTS

| | | | | |
|---|---|---|---|---|
| 4,597,677 | A | * | 7/1986 | Hagiwara ............. F16C 17/042 384/106 |
| 5,110,220 | A | | 5/1992 | Gu |
| 9,810,259 | B2 | * | 11/2017 | Furuno .................. F16C 17/047 |
| 9,903,411 | B2 | * | 2/2018 | Omori ..................... F16C 17/042 |
| 2006/0098907 | A1 | | 5/2006 | Hayashi et al. |
| 2015/0219147 | A1 | | 8/2015 | Furuno |
| 2016/0319859 | A1 | | 11/2016 | Omori |
| 2017/0298983 | A1 | | 10/2017 | Omori |

FOREIGN PATENT DOCUMENTS

| | | |
|---|---|---|
| CN | 103291745 A | 9/2013 |
| CN | 103341553 A | 10/2013 |
| CN | 104769296 A | 7/2015 |
| CN | 105874229 A | 8/2016 |
| CN | 107208694 A | 9/2017 |

(Continued)

*Primary Examiner* — James Pilkington
(74) *Attorney, Agent, or Firm* — Rothwell, Figg, Ernst & Manbeck, P.C.

(57) ABSTRACT

A thrust foil bearing includes a base plate including an insertion hole through which a rotating shaft is inserted and a support surface disposed around the insertion hole on one side of the insertion hole in an axial direction, and a back foil disposed on the support surface, in which the support surface has a plurality of inclined surfaces of which inclination angles inclined toward the other side of the base plate in the axial direction become shallower in order toward an outside of the insertion hole in a radial direction, and the back foil is divided into a plurality of divided regions in the radial direction by a slit, and the plurality of divided regions are supported by the plurality of inclined surfaces.

6 Claims, 9 Drawing Sheets

(56) References Cited

FOREIGN PATENT DOCUMENTS

| | | | |
|---|---|---|---|
| EP | 2910802 | A1 | 8/2015 |
| EP | 2949953 | A1 | 12/2015 |
| EP | 3048316 | A1 | 7/2016 |
| EP | 3048317 | A1 | 7/2016 |
| EP | 3101291 | A1 | 12/2016 |
| EP | 3258125 | A1 | 12/2017 |
| JP | 61-038322 | U | 3/1986 |
| JP | 2004-144205 | A | 5/2004 |
| JP | 2015-059629 | A | 3/2015 |
| JP | 6065917 | B2 | 1/2017 |
| WO | 2014/061698 | A1 | 4/2014 |
| WO | 2015/115464 | A1 | 8/2015 |
| WO | 2016/129579 | A1 | 8/2016 |

\* cited by examiner

THRUST FOIL BEARING, AND METHOD FOR MANUFACTURING BASE PLATE OF THRUST FOIL BEARING

TECHNICAL FIELD

The present invention relates to a thrust foil bearing and a method for manufacturing a base plate of a thrust foil bearing.

This application is a Continuation Application based on International Application No. PCT/JP2020/006075, filed on Feb. 17, 2020, which claims priority on Japanese Patent Application No. 2019-030418, filed on Feb. 22, 2019, the contents of which are incorporated herein by reference.

BACKGROUND ART

In the related art, as a bearing for a high-speed rotating body, a thrust foil bearing disposed to face a thrust collar provided on a rotating shaft is known (for example, refer to Patent Document 1 below). In the thrust foil bearing, a bearing surface is formed of a flexible foil (thin metal plate) to absorb a movement (axial displacement and inclination of the thrust collar) of the rotating shaft generated by vibration or impact, and a foil structure for flexibly supporting the bearing surface is provided below the bearing surface.

The thrust foil bearing has a form in which a plurality of top foil pieces and back foil pieces are arranged in a circumferential direction. The top foil piece is supported by the back foil piece, and as the thrust collar rotates, a lubricating fluid is introduced between the top foil piece and the thrust collar. This lubricating fluid forms a wedge-shaped fluid lubricating film between the top foil piece and the thrust collar, and a load capacity of the thrust foil bearing is exhibited.

CITATION LIST

Patent Document

[Patent Document 1]
Japanese Patent No. 6065917

SUMMARY OF THE INVENTION

Technical Problem

In the above related art, in order to form a wedge-shaped gap between a top foil and a thrust collar, back foil having a certain height is installed on an inclined surface inclined with respect to a flat surface extending in a direction orthogonal to an axial direction of a base plate. However, in the inclined surface, a difference in height between inner and outer circumferences of the base plate occurs, and thus, the gap between the top foil and the thrust collar becomes large on the outer peripheral side, which may affect the load capacity of the thrust foil bearing.

The present disclosure is made in view of the above circumstances, and an object of the present disclosure is to improve the load capacity of the thrust foil bearing.

Solution to Problem

According to a first aspect of the present disclosure, a thrust foil bearing is provided including: a base plate including an insertion hole through which a shaft is inserted and a support surface disposed around the insertion hole on one side of the insertion hole in an axial direction; and a back foil supported by the support surface, in which the support surface has a plurality of inclined surfaces of which inclination angles inclined toward the other side of the base plate in the axial direction become shallower in order toward an outside of the insertion hole in a radial direction, and the back foil is divided into a plurality of divided regions in the radial direction by a slit, and the plurality of divided regions are supported by the plurality of inclined surfaces.

In the thrust foil bearing according to a second aspect of the present disclosure, in the first aspect, a step is formed between the inclined surfaces adjacent to each other in the radial direction among the plurality of inclined surfaces.

In the thrust foil bearing according to the third aspect of the present disclosure, in the second aspect, the slit is formed at a radial position facing the step in the axial direction.

In the thrust foil bearing according to the fourth aspect of the present disclosure, in the second or third aspect, an inner end edge of at least one of the plurality of divided regions in the radial direction extends further inward in the radial direction than the step on an inner end edge side of the inclined surface supporting the divided region in the radial direction.

According to a fifth aspect of the present disclosure, a method is provided for manufacturing a base plate of a thrust foil bearing including an insertion hole through which a shaft is inserted, a flat surface extending in a direction orthogonal to an axial direction of the insertion hole, and a plurality of inclined surfaces of which inclination angles with respect to the flat surface become shallower in order toward an outside of the insertion hole in a radial direction, the method including forming the plurality of inclined surfaces by press working.

In the method for manufacturing a base plate of a thrust foil bearing according to a sixth aspect of the present disclosure, in the fifth aspect, in the press working, the plurality of inclined surfaces are formed by using a plurality of dies having inclination angles corresponding to the plurality of inclined surfaces.

According to the present disclosure, a load capacity of a thrust foil bearing can be improved.

Figure 10:
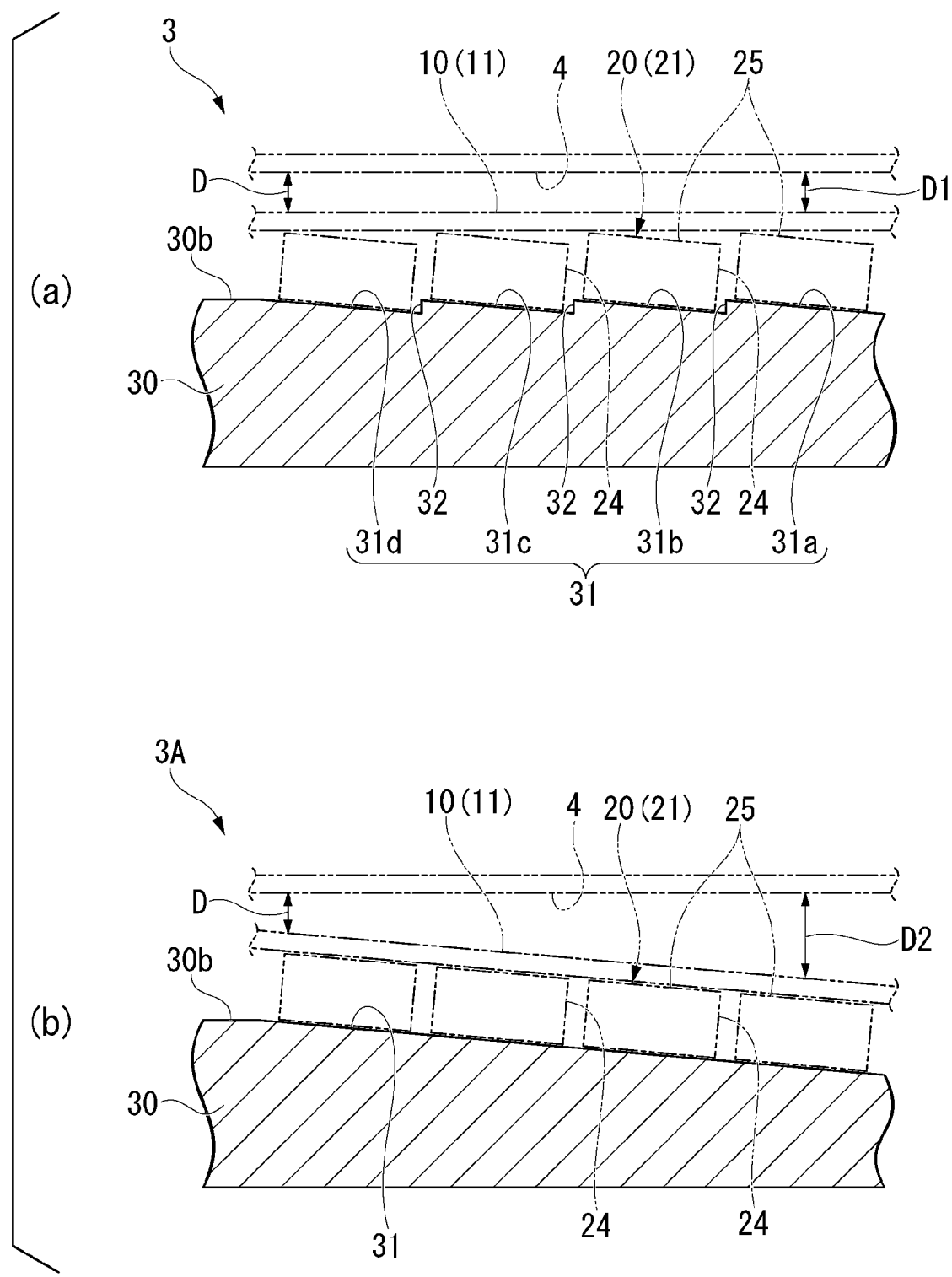

A part (a) of FIG. 10 is an explanatory view describing an operation of a support surface having the plurality of inclined surfaces according to the first embodiment of the present disclosure, and a part (b) of FIG. 10 is an explanatory view describing a case of a single support surface (inclined surface) of the related art which does not have the plurality of inclined surfaces as a comparative example.

Figure 11:
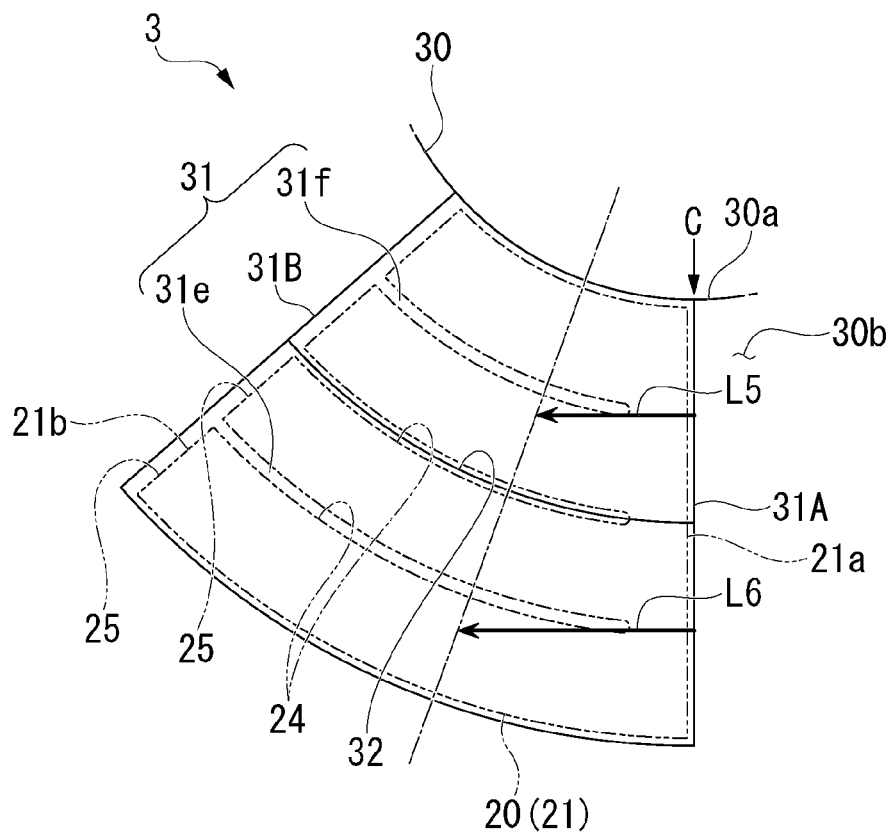

FIG. 11 is an enlarged plan view showing a support surface of a base plate according to a second embodiment of the present disclosure.

Figure 12:
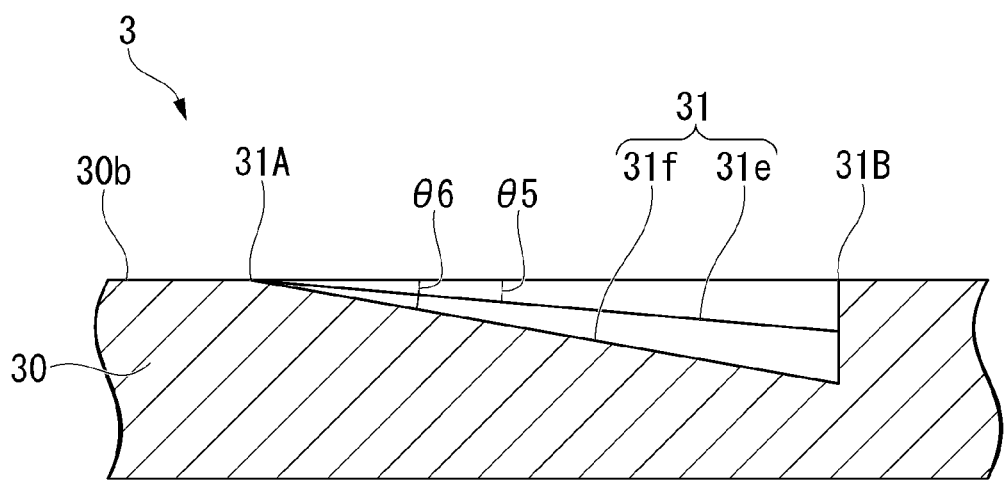

FIG. 12 is a schematic view when viewed from an arrow C shown in FIG. 11.

Figure 13:
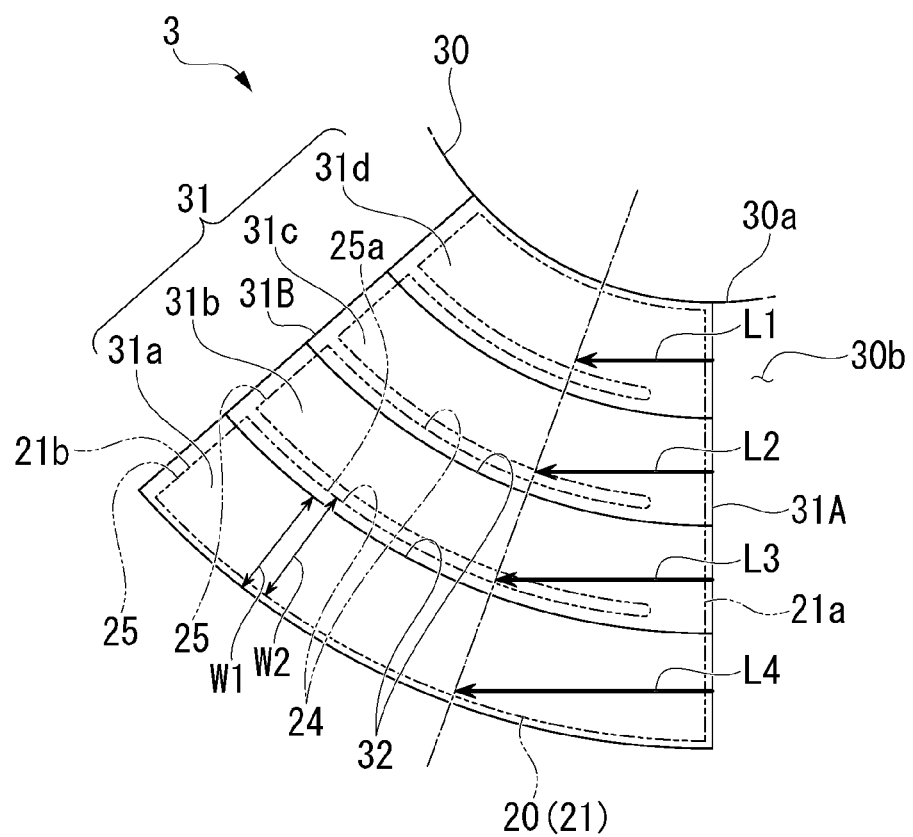

FIG. 13 is an enlarged plan view showing a support surface of a base plate according to a third embodiment of the present disclosure.

DETAILED DESCRIPTION OF THE EMBODIMENTS

Hereinafter, a thrust foil bearings of the present disclosure will be described in detail with reference to the drawings.

Figure 1:
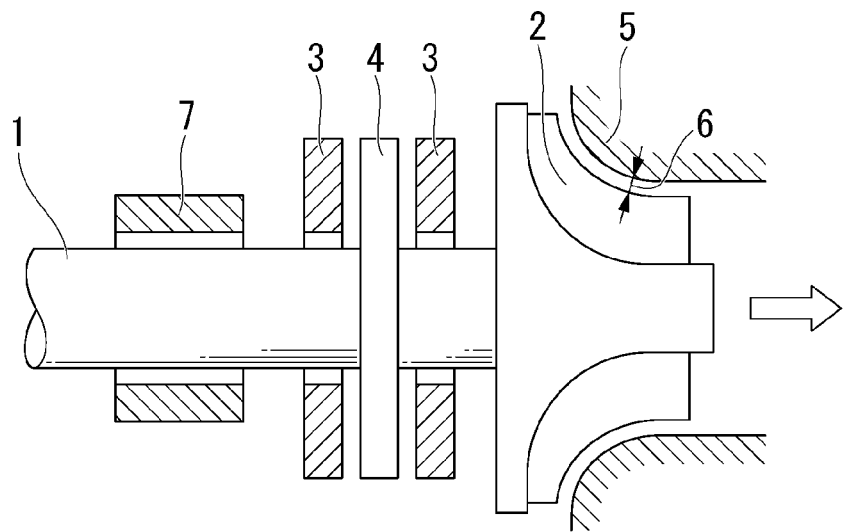
FIG. 1 is a side view showing an example of a turbomachine to which a thrust foil bearing is applied.

FIG. 1 is a side view showing, an example of a turbomachine to which a thrust foil bearing of the present disclosure is applied.

In FIG. 1, the reference numeral 1 indicates a rotating shaft (shaft), the reference numeral 2 indicates an impeller provided at a distal portion of the rotating shaft, and the reference numeral 3 indicates a thrust foil bearing according to the present disclosure.

A disk-shaped thrust collar 4 is attached to the rotating shaft 1. The thrust collar 4 is interposed between a pair of thrust foil bearings 3. The impeller 2 is disposed in a housing 5 located on a stationary side (a member that is stationary without rotating with respect to the rotating impeller 2), and a tip clearance 6 is provided between the impeller 2 and the housing 5. The rotating shaft 1 is supported by a radial foil bearing 7.

Figure 2:
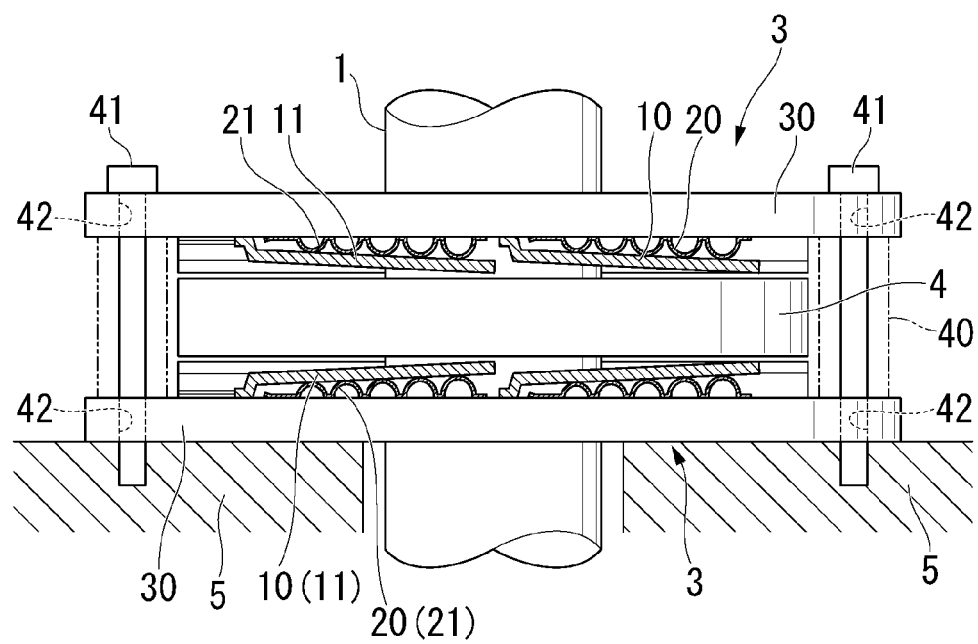
FIG. 2 is a side view showing a thrust foil bearing of the present disclosure.

FIG. 2 is a side view showing the thrust foil bearing 3 of the present disclosure.

As shown in FIG. 2, the thrust foil bearings 3 are provided in pairs on both sides so that the thrust collar 4 is interposed therebetween. Each thrust bearing 3 of the pair of thrust foil bearings 3 has the same configuration. The thrust foil bearing 3 includes a top foil 10, a back foil 20, and a base plate 30.

Cylindrical bearing spacers 40 indicated by chain double-dashed lines are interposed between the base plates 30 of the pair of thrust foil bearings 3. Moreover, the base plates 30 are connected by fastening bolts 41 via bearing spacers 40. A through hole 42 through which the fastening bolt 41 is inserted is formed in an outer peripheral portion of each of the base plates 30. One of the base plates 30 connected in this way is in contact with the housing 5 by tightening with the fastening bolt 41.

First Embodiment

Figure 3:
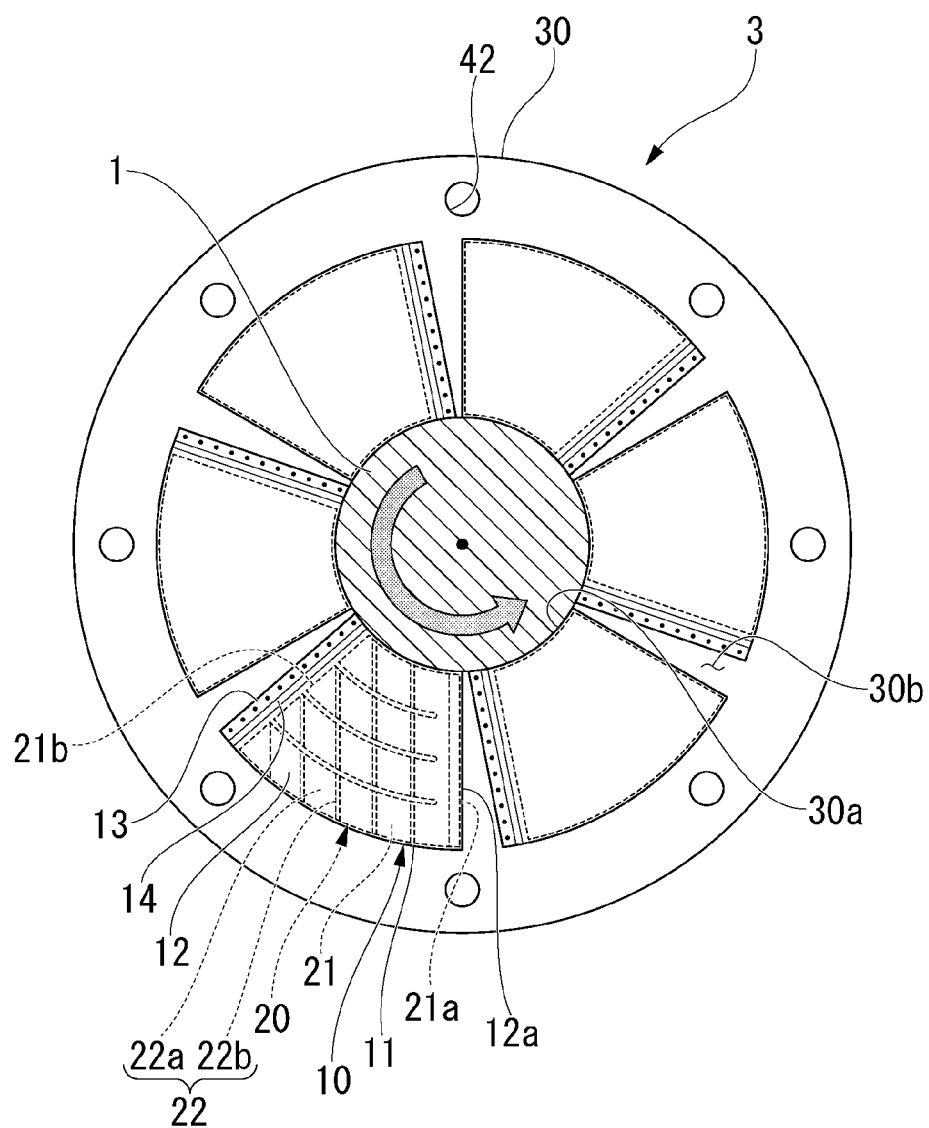
FIG. 3 is a plan view showing a thrust foil bearing according to a first embodiment of the present disclosure.
Figure 4:
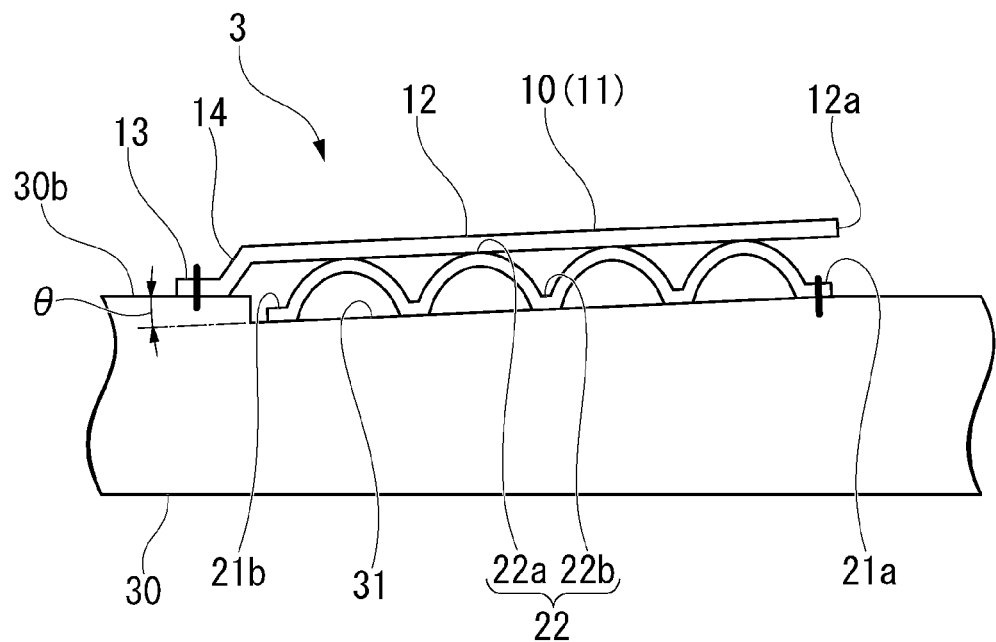
FIG. 4 is a cross-sectional view of a main portion of the thrust foil bearing shown in FIG. 3.

FIG. 3 is a plan view showing the thrust foil bearing 3 according to a first embodiment of the present disclosure. FIG. 4 is a cross-sectional view of a main portion of the thrust foil bearing 3 shown in FIG. 3.

As shown in FIG. 3, the base plate 30 has an insertion hole 30a through which the rotating shaft 1 is inserted.

In the following description, a positional relationship of each member may be described based on the insertion hole 30a. Specifically, "axial direction" refers to a direction (a direction in which the rotating shaft 1 is inserted) in which the insertion hole 30a extends. Further, "radial direction" refers to a radial direction of the insertion hole 30a. Moreover, a "circumferential direction" refers to a circumferential direction along an inner peripheral surface of the insertion hole 30a. Alternatively, based on an axis of the rotating shaft 1 inserted through the insertion hole 30a, when viewed from the axis, the directions can be said to be the "radial direction" and the "circumferential direction".

The base plate 30 constitutes an outermost side (counter thrust collar side) of the thrust foil bearing 3 in the axial direction. The insertion hole 30a is formed in the base plate 30.

That is, the base plate 30 of the present disclosure is a disk-shaped member in which an insertion hole 30a is formed. However, as long as the insertion hole 30a is provided, the base plate 30 may be a member having a shape (for example, a rectangular plate shape) other than a disk shape. Further, the insertion hole 30a does not necessarily have to have a strict cylindrical shape.

The base plate 30 is formed of, for example, a metal plate having a thickness of about several millimeters. The top foil 10 and the back foil 20 are disposed around the insertion hole 30a (opening) on a flat surface 30b of the base plate 30 which is disposed so as to face the thrust collar 4. Specifically, the top foil 10 is supported by the back foil 20, and the back foil 20 is supported by the base plate 30. That is, the top foil 10 is also supported by the base plate 30 via the back foil 20.

In the present disclosure, the top foil 10 and the back foil 20 are each formed by a plurality of (six) top foil pieces 11 and back foil pieces 21. The base plate 30 supports the six top foil pieces 11 and six back foil pieces 21 at equal intervals in the circumferential direction of the flat surface 30b. The number of each of top foil pieces 11 and back toil pieces 21 is not limited to six.

The top foil 10 of the present disclosure is formed of thin metal plates (top foil pieces 11) arranged in the circumferential direction. The top foil piece 11 includes an inclined portion 12 which is inclined upward (a front side of a paper surface in FIG. 3 or an axial side in a direction from the base plate 30 toward the top foil piece 11) from one side (an upstream side in a rotation direction of the rotating shaft 1) in the circumferential direction toward the other side (a downstream side in the rotation direction of the rotating shaft 1) in the circumferential direction, and an attachment portion 13 which extends to one side of the inclined portion 12 in the circumferential direction and is attached to the base plate 30. Here, the rotation direction of the rotating shaft 1 refers to a direction of an arrow displayed on the rotating shaft 1 of FIG. 3.

As shown in FIG. 3, the inclined portion 12 is formed in a substantially trapezoidal shape in which an apex side of a fan shape is cut out and an inner peripheral side and an outer peripheral side are each arcuate. That is, the inclined portion 12 includes two end edges which are separated from each other in the circumferential direction and extend from the inner peripheral side to the outer peripheral side, an inner peripheral end edge which connects the two end edges on the inner peripheral side, and an outer peripheral end edge which connects the two end edges on the outer peripheral side. An end edge (hereinafter, referred to as an end portion 12a on the other side in the circumferential direction) of the inclined portion 12 extending from the inner peripheral side to the outer peripheral side on the other side in the circumferential direction is a free end.

An end edge extending from the inner peripheral side to the outer peripheral side on one side in the circumferential direction of the inclined portion 12 is connected to the attachment portion 13 via a bent portion 14. As shown in FIG. 4, the bent portion 14 includes a first bend and a second bend located on the outer side of the first bend in the circumferential direction. The first bend is bent to a rear surface side of a surface of the top foil piece 11 facing the base plate 30. The second bend is bent to a surface side of the top foil piece 11 facing the base plate 30. That is, the bent portion 14 has a stepped shape. Both the first bend and the second bend have obtuse angles.

The inclined portion 12 located on the other side in the circumferential direction from the bent portion 14 is supported by a support portion 22 of the back foil piece 21. The inclined portion 12 supported by the support portion 22 is disposed to be inclined at an initial inclination angle so as to be gradually away from the base plate 30 from one side in the circumferential direction toward the other side in the circumferential direction. Here, the initial inclination angle means an inclination angle of the top foil piece 11 with respect to the base plate 30 when a load is zero. The base plate 30 of the present disclosure has a flat surface 30b extending in a direction orthogonal to the axial direction, and the inclined portion 12 is inclined with respect to the flat surface 30b.

The attachment portion 13 is connected to one side (first bend side) of the bent portion 14 in the circumferential direction. In the present disclosure, the attachment portion 13 is formed in a strip shape having the same length as the bent portion 14 in the radial direction and is spot welded (dot welded) to the base plate 30. That is, this welding position is an attachment position of the top foil piece 11 with respect to the base plate 30. The top foil piece 11 can be attached to the base plate 30 by, for example, screwing, in addition to the spot welding. Further, the attachment portion 13 and the bent portion 14 do not necessarily have to have the same length in the radial direction.

As shown in FIG. 3, the back foil 20 is formed of thin metal plates (back foil pieces 21) arranged in the circumferential direction. Each of the back foil pieces 21 has the support portion 22 that supports the inclined portion 12 of the top foil piece 11. As shown in FIG. 4, the support portion 22 is a corrugated foil (bump foil) in which peak portions 22a and valley portions 22b are alternately formed. The support portion 22 elastically supports the inclined portion 12 of the top foil piece 11.

As the support portion 22, for example, a bump foil, a spring foil described in Japanese Unexamined Patent Application, First Publication No. 2006-57652 and Japanese Unexamined Patent Application, First Publication No. 2004-270904, a back foil described in Japanese Unexamined Patent Application, First Publication No. 2009-299748, or the like can be used. The spring foil described in Japanese Unexamined Patent Application, First Publication No. 2006-57652 and Japanese Unexamined Patent Application, First Publication No. 2004-270904, and the back foil described in Japanese Unexamined Patent Application, First Publication No. 2009-299748 are foils used for a radial bearing. However, the foils are developed in a flat shape and formed into an annular plate shape, the foil (support portion 22) used for the thrust foil bearing 3 can be obtained.

The support portion 22 of the present disclosure is formed of a bump foil. The support portion 22 is formed to be one size smaller than the inclined portion 12 of the top foil piece 11 in a plan view shown in FIG. 3. Therefore, the support portion 22 is covered with the inclined portion 12. Like the inclined portion 12, the support portion 22 is formed in a substantially trapezoidal shape in which an apex side of a fan shape is cut out and an inner peripheral side and an outer peripheral side are each arcuate. That is, the support portion 22 includes two end edges which are separated from each other in the circumferential direction and extend from the inner peripheral side to the outer peripheral side, an inner peripheral end edge which connects the two end edges on the inner peripheral side, and an outer peripheral end edge which connects the two end edges on the outer peripheral side.

In the support portion 22, the valley portions 22b and the peak portions 22a are alternately connected in a normal direction (hereinafter, referred to as a first direction) orthogonal to the end edge (hereinafter, referred to as a back foil first end portion 21a) extending from the inner peripheral side to the outer peripheral side on the other side of the circumferential direction of the support portion 22. The first direction is also referred to as a direction orthogonal to a ridgeline of the peak portion 22a. Further, one side of the first direction indicates a left side of a paper surface in FIG. 5 described below, and the other side of the first direction indicates a right side of a paper surface in FIG. 5 described below. Incidentally, the above-described "circumferential direction" and "first direction" are directions of different concepts.

As shown in FIG. 4, the valley portion 22b has a flat surface and faces the base plate 30.

Further, the peak portion 22a is an arch-shaped portion connecting adjacent valley portions 22b. The back foil piece 21 is supported by the base plate 30. Therefore, the valley portion 22b can meet the base plate 30. Both end portions of the support portion 22, that is, the back foil first end portion 21a and an end portion (hereinafter, a back foil second end portion 21b) on one side of the support portion 22 in the circumferential direction are each formed by the valley portions 22b.

In the present disclosure, the valley portions 22b and the peak portions 22a are each formed at substantially equal pitches.

Further, a height of the peak portion 22a (difference in height between the valley portion 22b and the peak portion 22a) is formed at a constant height. The base plate 30 is formed with a support surface 31 that supports the support portion 22. The support surface 31 is disposed around the insertion hole 30a on one side of the insertion hole 30a in the axial direction. The support surface 31 is an inclined surface that gradually rises (approaches the flat surface 30b) toward the other side (right side of the paper surface in FIG. 4) in the first direction with respect to the flat surface 30b of the base plate 30. In other words, the support surface 31 is inclined toward the other side (rear surface side) of the base plate 30 in the axial direction. Therefore, the inclined portion 12 of the top foil piece 11 on the back foil piece 21 supported by the support surface 31 is inclined with respect to the flat surface 30b. In the present disclosure, the direction on the other side in the first direction and the direction on the other side in the circumferential direction do not match, but an angle between them is an inferior angle.

The back foil first end portion 21a of the back foil piece 21 is spot welded (dot welded) to the base plate 30. That is, this welding position is an attachment position of the back foil piece 21 with respect to the base plate 30. That is, in the present disclosure, the attachment position of the back foil piece 21 is the valley portion 22b (back foil first end portion 21a) located at the end on the other side (right side of the paper surface in FIG. 4) in the first direction.

Further, the valley portion 22b (back foil second end portion 21b) located at an end on one side (left side of the paper surface in FIG. 4) of the back foil piece 21 in the first direction is a free end. That is, when a load acts on the back foil piece 21, the back foil second end portion 21b can move toward one side in the first direction. The back foil piece 21 can be attached to the base plate 30 by, for example, screwing, in addition to spot welding.

Figure 5:
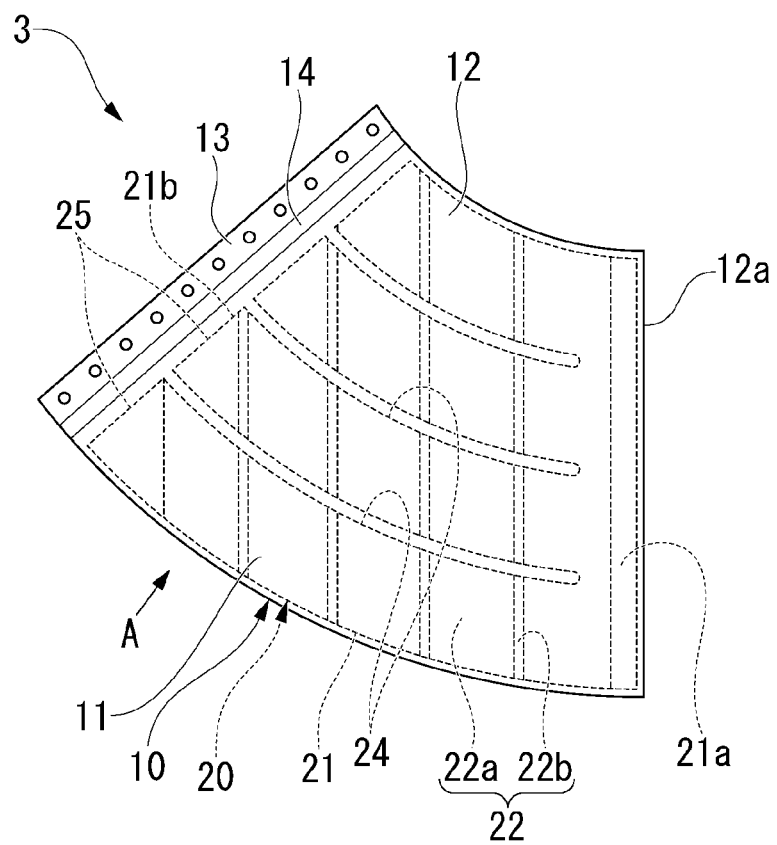
FIG. 5 is an enlarged plan view of a top foil piece and a back foil piece shown in FIG. 3.

FIG. 5 is an enlarged plan view of the top foil piece 11 and the back foil piece 21 shown in FIG. 3.

As shown in FIG. 5, the back foil second end portion 21b (free end) of the back foil piece 21 of the present disclosure is formed by a plurality of end edges separated from the inner peripheral side to the outer peripheral side. That is, the back foil piece 21 is formed with a plurality of slits 24 extending in the circumferential direction from the back foil second end portion 21b toward the back foil first end portion 21a. Therefore, the back foil piece 21 is divided into a plurality of divided regions 25 in the radial direction by the plurality of slits 24. Specifically, in the back foil piece 21, on one side (upstream side in the rotation direction) in the circumferential direction is divided into the plurality of (four in the present disclosure) divided regions 25 in the radial direction.

Each of the four divided regions 25 is displaceable in the first direction. The slits 24 are formed between the four divided regions 25. The slit 24 of the present disclosure is formed in an arc shape forming a portion of a concentric circle with the insertion hole 30a. Further, the slit 24 of the present disclosure extends to the peak portion 22a adjacent to the attachment position (back foil first end portion 21a) of the back foil piece 21 with respect to the base plate 30. That is, the slit 24 extends to a position between the attachment position of the back foil piece 21 and the valley portion 22b adjacent to one side of the attachment position in the circumferential direction.

Figure 6:
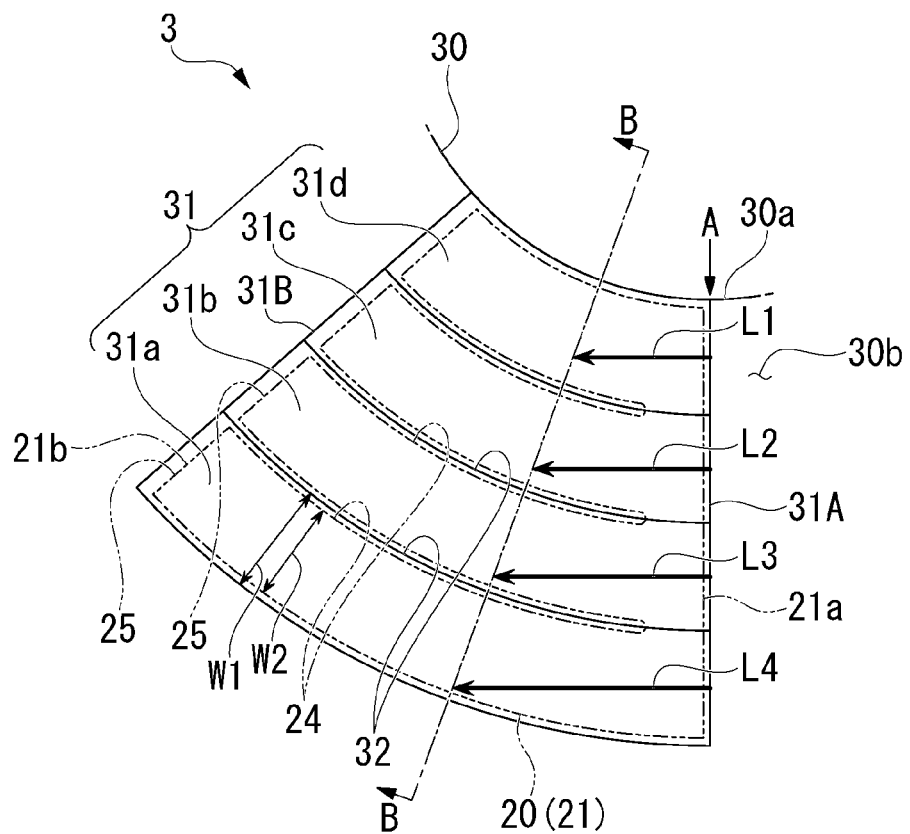
FIG. 6 is an enlarged plan view of a support surface of a base plate that supports the back foil piece shown in FIG. 5.
Figure 7:
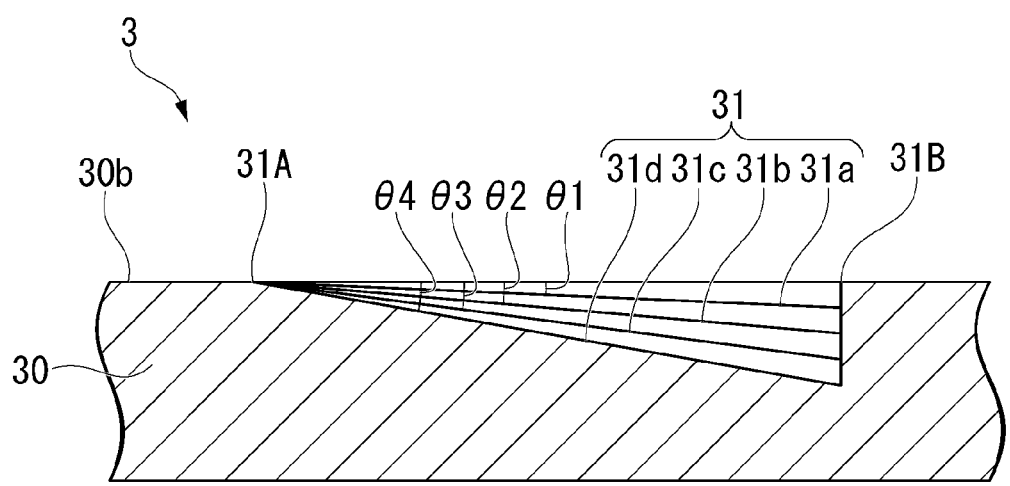
FIG. 7 is a schematic view when viewed from an arrow A shown in FIG. 6.

FIG. 6 is an enlarged plan view of the support surface 31 of the base plate 30 that supports the back foil piece 21 shown in FIG. 5. FIG. 7 is a schematic view when viewed along an arrow A shown in FIG. 6.

As shown in FIG. 6, the support surface 31 of the base plate 30 is formed to be one size larger than the back foil piece 21. Like the back foil piece 21, the support surface 31 is formed in a substantially trapezoidal shape in which an apex side of a fan shape is cut out and an inner peripheral side and an outer peripheral side are each arcuate.

That is, the support surface 31 includes two end edges which are separated from each other in the circumferential direction and extend from the inner peripheral side to the outer peripheral side, an inner peripheral end edge which connects the two end edges on the inner peripheral side, and an outer peripheral end edge which connects the two end edges on the outer peripheral side. A boundary of the support surface 31 does not have to be clarified by a step or the like.

The support surface 31 of the present disclosure is formed by a plurality of (four in the present disclosure) inclined surfaces 31a to 31d separated in the radial direction. Of the plurality of inclined surfaces 31a to 31d, the inclined surface 31a is disposed on the outermost peripheral side, and the inclined surfaces 31b, 31c, and 31d are disposed in this order from the inclined surface 31a toward the inside in the radial direction. The plurality of inclined surfaces 31a to 31d are inclined with respect to the flat surface 30b from an end edge (hereinafter, referred to as an end portion 31A on the other side of the support surface 31 in the circumferential direction) extending from the inner peripheral side to the outer peripheral side on the other side of the support surface 31 in the circumferential direction toward one side (toward directions indicated by the reference numerals L1 to L4 in FIG. 6) in the above-described first direction. That is, the support surface 31 is inclined toward the rear surface side of the base plate 30 toward one side in the first direction. Further, an axial height of the back foil first end portion 21a attached to the end portion 31A on the other side of the support surface 31 in the circumferential direction is constant in the radial direction. Further, in the present disclosure, the heights of the plurality of inclined surfaces 31a to 31d are constant at positions parallel to the back foil first end portion 21a.

As shown in FIG. 7, inclination angles θ1 to θ4 of the plurality of inclined surfaces 31a to 31d with respect to the flat surface 30b become shallower (smaller) in order toward the outside of the insertion hole 30a in the radial direction. That is, the inclination angle θ1 of the inclined surface 31a disposed on the outermost peripheral side is the shallowest (smallest), the inclination angle θ2 of the inclined surface 31b, the inclination angle θ3 of the inclined surface 31c, and the inclination angle θ4 of the inclined surface 31d are deeper (larger) in this order. The inclination angles θ1 to θ4 may be set within the range of the initial inclination angle θ of the inclined portion 12 of the top foil piece 11 shown in FIG. 4, and for example, may be set to a value obtained by dividing the initial inclination angle θ into four equal portions.

As shown in FIG. 6, among the plurality of inclined surfaces 31a to 31d, a step 32 is formed between the inclined surfaces adjacent to each other in the radial direction. The step 32 of the present disclosure is formed in an arc shape forming a portion of a concentric circle with the insertion hole 30a. Further, the step 32 of the present disclosure extends from the end portion 31A on the other side of the support surface 31 in the circumferential direction to an end edge (hereinafter, referred to as an end portion 31B on one side of the support surface 31 in the circumferential direction) extending from the inner peripheral side to the outer peripheral side on one side of the support surface 31 in the circumferential direction. In the present disclosure, radial positions of the step 32 and the slit 24 match each other. That is, the slit 24 is formed at the radial position facing the step 32 in the axial direction.

Further, in the present disclosure, the plurality of slits 24 extend to a position parallel to the back foil first end portion 21a. That is, a root (groove end) of each slit 24 is rounded, and a straight line extending in the radial direction connecting the rounds is parallel to the back foil first end portion 21a.

Further, the step 32 of the base plate 30 of the present disclosure is formed from a position where a plurality of slits 24 are rounded toward one side (upstream side in the rotation direction) in the circumferential direction. Further, in the present disclosure, the step 32 becomes larger toward one side in the circumferential direction. Further, as in the present disclosure, the step 32 of the base plate 30 may extend to the other side (downstream side in the rotation direction) in the circumferential direction from the position where the plurality of slits 24 are round. However, the step 32 of the base plate 30 does not extend beyond the back foil first end portion 21a.

Further, in the present disclosure, the four divided regions 25 of the back foil piece 21 divided in the radial direction by the slit 24 are supported by the four inclined surfaces 31a to 31d divided in the radial direction by the step 32. That is, the four divided regions 25 are supported one-to-one by the four inclined surfaces 31a to 31d. As for the radial dimensions of one inclined surface and one divided region 25 supported by the inclined surface, for example, assuming that a dimension of the inclined surface (for example, the inclined surface 31a) is represented by W1 and a dimension of the divided region 25 is represented by W2, a relationship of W1>W2 is satisfied.

Figure 8:
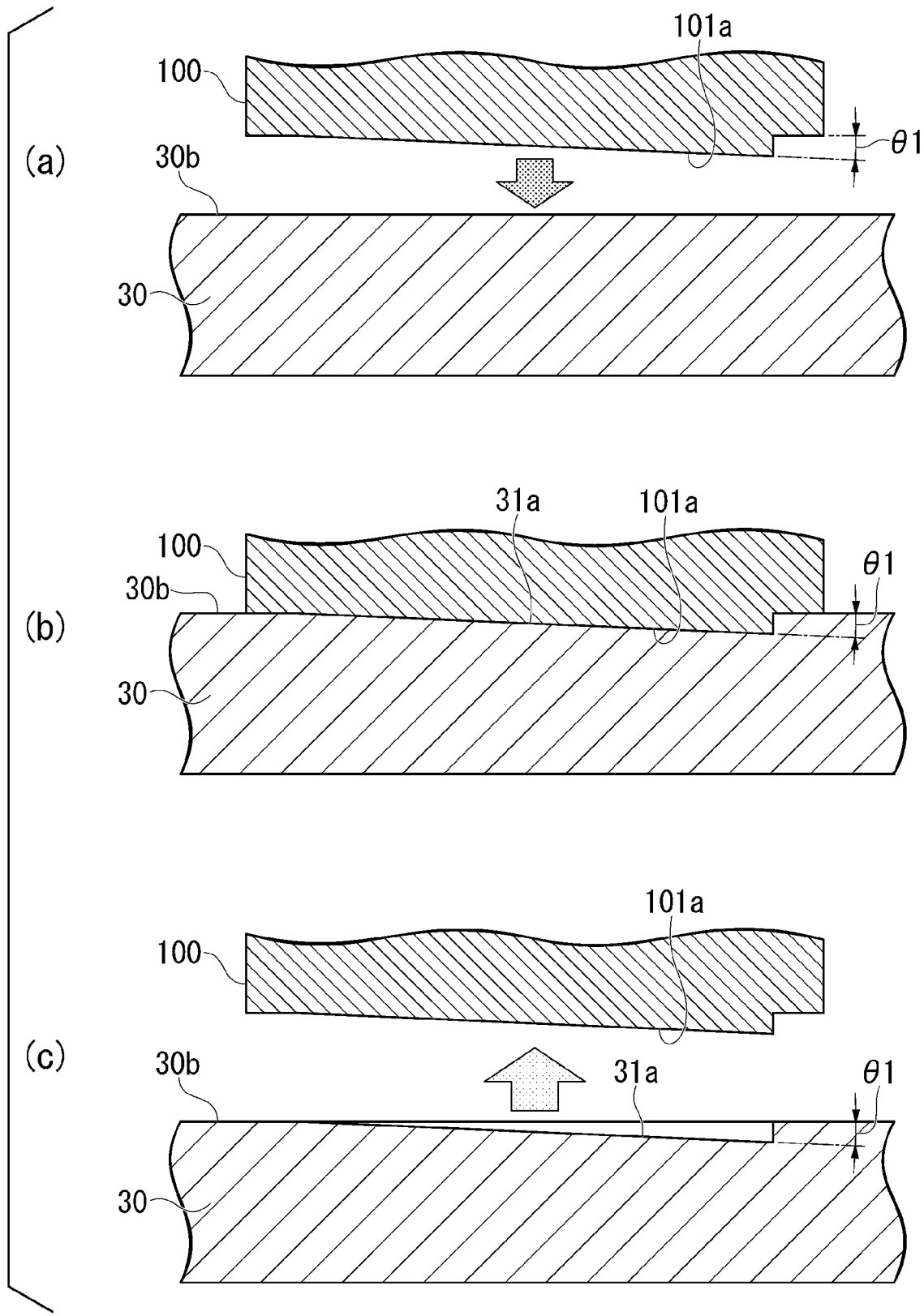
FIG. 8 is an explanatory view showing a process of forming a plurality of inclined surfaces on a base plate according to the first embodiment of the present disclosure.
Figure 9:
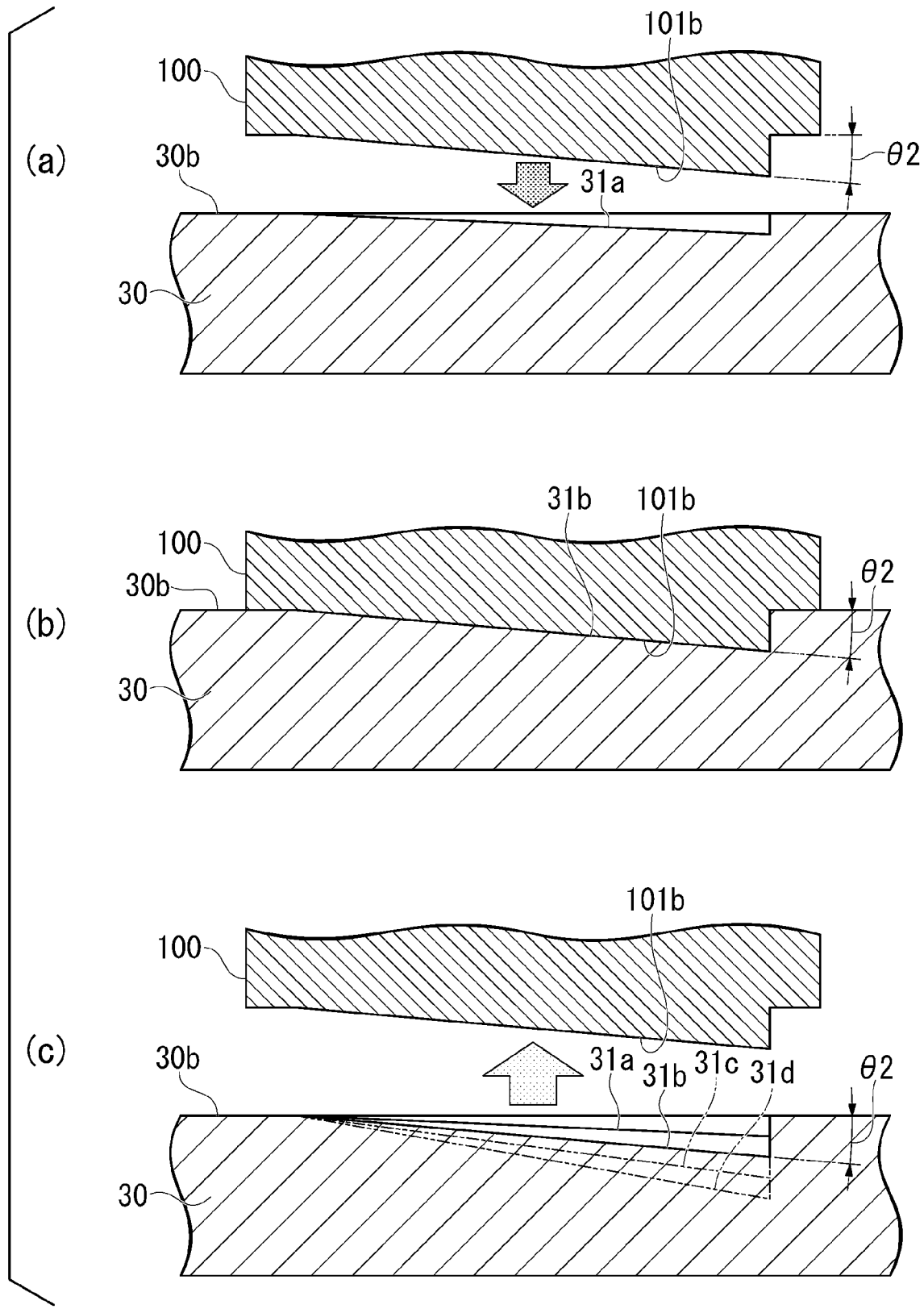
FIG. 9 is an explanatory view showing the process of forming the plurality of inclined surfaces on the base plate according to the first embodiment of the present disclosure.

The base plate 30 having the plurality of inclined surfaces 31a to 31d having the above configuration can be formed, for example, by press working as shown in FIGS. 8 and 9.

FIGS. 8 and 9 are explanatory views showing a process of forming the plurality of inclined surfaces 31a to 31d on the base plate 30 according to the first embodiment of the present disclosure.

In the press working in this process, a die 100 having a convex portion 101a on a press surface as shown in the part (a) of FIG. 8 may be used.

The die 100 includes the convex portion 101a on the press surface of which a distal surface is inclined at an inclination angle θ1 in the first direction (right-left direction of a paper surface in FIG. 8). That is, the distal surface of the convex portion 101a extends toward the flat surface 30b of the base plate 30 toward one side (right side of the paper surface in FIG. 8) in the first direction. Further, the distal surface of the convex portion 101a is formed in a substantially trapezoidal shape similar to the inclined surface 31a shown in the plan view of FIG. 6 described above.

The flat surface 30b of the base plate 30 is pressed by the die 100 as shown in a part (b) of FIG. 8. By this press working, the inclined surface 31a to which the shape of the convex portion 101a of the die 100 is transferred is formed on the flat surface 30b of the base plate 30.

As a result, as shown in a part (c) of FIG. 8, the inclined surface 31a inclined at the inclination angle θ1 with respect to the flat surface 30b can be formed on the flat surface 30b of the base plate 30.

In the next process, a die 100 having a convex portion 101b on a press surface as shown in a part (b) of FIG. 9 may be used. The die 100 includes the convex portion 101b on the press surface whose distal surface is inclined an inclination angle θ2 in the first direction (the right-left direction of the paper surface in FIG. 8). A distal surface of the convex portion 101b is formed in a substantially trapezoidal shape similar to the inclined surface 31b shown in FIG. 6 described above.

As shown in a part (b) of FIG. 9, the die 100 presses an inner peripheral side from the inclined surface 31a of the flat surface 30b of the base plate 30. By this press working, the inclined surface 31b to which the shape of the convex portion 101b of the die 100 is transferred is formed on the inner peripheral side of the inclined surface 31a. In this way, performing stamping (pressing) in order by using the dies having the inclination angles θ1 to θ4 corresponding to the plurality of inclined surfaces 31a to 31d, as shown in FIG. 6, the plurality of inclined surfaces 31a to 31d, of which the inclination angles become shallower in order toward the outside in the radial direction, can be formed on the flat surface 30b of the base plate 30.

According to the method for manufacturing the base plate 30, a time for processing the plurality of inclined surfaces 31a to 31d is shortened, and a cost is reduced. Further, in this way, by applying the press working which is cheaper than a cutting work, the base plate 30 can be easily mass-produced.

The order of pressing the plurality of inclined surfaces 31a to 31d may be in the order of deeper inclination angles (in the order of inclined surfaces 31d, 31c, 31b, 31a), or in any order. Further, when the die 100 includes a plurality of convex portions having the plurality of inclination angles θ1 to θ4, the inclined surfaces 31a to 31d may be formed by a single press.

Further, after pressing the entire surface (inclination angle is 0) of the support surface 31 with a die having the same inclination angle θ1 as the shallowest inclined surface 31a, the entire surface (surface having inclination angle θ1) of the support surface 31 excluding the inclined surface 31a may be pressed with a die having the same inclination angle θ2 as the next shallow inclined surface 31b, and thus, the inclined surfaces, which are gradually deeper toward the inside in the radial direction, may be formed by repeating this.

Next, an operation of the thrust foil bearing 3 including the base plate 30 having the configuration will be described.

As shown in FIG. 2, the thrust foil bearings 3 are provided on both sides of the thrust collar 4 with the thrust collar 4 therebetween. Therefore, the movement of the rotating shaft 1 on both sides in the thrust direction can be suppressed.

When the rotating shaft 1 rotates in this state and the thrust collar 4 starts rotating, the thrust collar 4 and the top foil piece 11 rub against each other, and a surrounding fluid is pushed into a wedge-shaped space formed between the thrust collar 4 and the top foil piece 11. Then, when the thrust collar 4 reaches a constant rotation speed, a fluid lubricating film is formed between the thrust collar 4 and the top foil piece 11. The top foil piece 11 is pushed toward the back foil piece 21 by a pressure of the fluid lubricating film, and the thrust collar 4 comes out of contact with the top foil piece 11 and rotates in a non-contact manner.

Here, as shown in FIG. 6, the back foil piece 21 is supported by a support surface 31 inclined with respect to the flat surface 30b of the base plate 30. The support surface 31 is inclined toward one side (left side of the paper surface in FIG. 6) in the first direction orthogonal to the back foil first end portion 21a extending in the radial direction of the back foil piece 21. The plurality of inclined surfaces 31a to 31d forming the support surface 31 have the same height at the circumferential position supporting the back foil first end portion 21a. However, when the inclined surfaces 31a to 31d move to one side in the circumferential direction from the circumferential position (for example, when line B-B is drawn at the same angle in FIG. 6), due to the difference between the inner and outer circumferences of the base plate 30, an inclination stroke (for example, a length of an arrow indicated by the reference numeral L1) of the inclined surface disposed on the inner side in the radial direction is shorter than an inclination stroke (for example, the length of an arrow indicated by the reference numeral L2) of the inclined surface disposed on the outer side in the radial direction. That is, it can be said that the inclination stroke becomes longer in the order of reference numerals L1 to L4 from the inner peripheral side to the outer peripheral side.

A part (a) of FIG. 10 is an explanatory view describing the operation of the support surface 31 having the plurality of inclined surfaces 31a to 31d according to the first embodiment of the present disclosure, and a part (b) of FIG. 10 is an explanatory view describing a case of a single support surface 31 (inclined surface) of the related art which does not have the plurality of inclined surfaces 31a to 31d as a comparative example. FIG. 10 is a schematic cross-sectional view of the circumferential position corresponding to line B-B shown in FIG. 6. Line B-B shown in FIG. 6 is a straight line extending in the radial direction. That is, FIG. 10 is a cross-sectional view when the base plate 30 is cut in the radial direction. In addition, in FIG. 10, in order to improve visibility, the inclination of the support surface 31 having the plurality of inclined surfaces 31a to 31d shown in the part (a) of FIG. 10 and the inclination of the single support surface 31 shown in the part (b) of FIG. 10 are expressed exaggeratedly. The actual inclination angle of the support surface 31 is, for example, about 0.1°, and thus, the support surface 31 looks like a substantially flat surface.

First, when the single support surface 31 (inclined surface) of the related art shown in the part (b) of FIG. 10 is described, in the inclined surface 31, the inclination stroke on the outer peripheral side is longer than that on the inner peripheral side due to the difference between the inner and outer circumferences of the base plate 30 described above, and as a result, the outer peripheral side becomes lower than the inner peripheral side at the same circumferential position, and the outer peripheral side is largely separated from the thrust collar 4 in the axial direction.

That is, while a gap between the thrust collar 4 and the top foil piece 11 on the inner peripheral side of the base plate 30 is a dimension D, the gap on the outer peripheral side of the base plate 30 is a dimension D2 which is larger than the dimension D. When the gap between the thrust collar 4 and the top foil piece 11 becomes large, it is difficult to form the above-described fluid lubricating film satisfactorily.

On the other hand, although there is the difference between the inner and outer circumferences of the base plate 30 described above, in the support surface 31 having the plurality of inclined surfaces 31a to 31d shown in the part (a) of FIG. 10 of the present disclosure, the inclination angles of the inclined surfaces 31a to 31d with respect to flat surface 30b become shallower (smaller) in order toward the outer side of the insertion hole 30a in the radial direction. Accordingly, the top foil piece 11 on the outer peripheral side is lifted to the thrust collar 4 side via the back foil piece 21, the gap between the thrust collar 4 and the top foil piece 11 on the outer peripheral side can be brought close to the same dimension D1 as the dimension D on the inner peripheral side. As a result, the above-described fluid lubricating film can be satisfactorily formed even on the outer peripheral side of the base plate 30.

Therefore, according to the first embodiment described above, the thrust foil bearing 3 includes the base plate 30 including the insertion hole 30a through which the rotating shaft 1 is inserted and the support surface 31 disposed around the insertion hole 30a on one side of the insertion hole 30a in the axial direction, and the back foil 20 disposed on the support surface 31, the support surface 31 has the plurality of inclined surfaces 31a to 31d of which the inclination angles inclined toward the other side of the base plate 30 in the axial direction become shallower in order toward the outside of the insertion hole 30a in a radial direction, and the back foil 20 is divided into the plurality of divided regions 25 in the radial direction by the slit 24, and the plurality of divided regions 25 are supported by the plurality of inclined surfaces 31a to 31d. Therefore, by adopting the configuration, a load capacity of the thrust foil bearing 3 can be improved.

Further, in the present disclosure, as shown in FIG. 6, the step 32 is formed between the inclined surfaces 31a to 31d adjacent to each other in the radial direction among the plurality of inclined surfaces 31a to 31d, and the slit 24 is formed at a radial position facing the step 32 in the axial direction. According to this configuration, since the plurality of divided regions 25 can be deformed by the slits 24 at the same radial position as the step 32, the plurality of divided regions 25 of the back foil piece 21 can be satisfactorily placed on the plurality of inclined surfaces 31a to 31d having different inclination angles.

Second Embodiment

Next, a second embodiment of the present disclosure will be described. In the following description, the same or equivalent configurations as those in the above-described embodiment are designated by the same reference numerals, and descriptions thereof will be simplified or omitted.

FIG. 11 is an enlarged plan view showing a support surface 31 of a base plate 30 according to the second embodiment of the present disclosure. FIG. 12 is a schematic view when viewed from an arrow C shown in FIG. 11.

As shown in FIG. 11, the second embodiment differs from the above embodiment in that the number of divisions of the inclined surface 31 of the support surface 31 is smaller than the number of divisions of the divided region 25 of the back foil piece 21.

The support surface 31 of the second embodiment is formed by a plurality of (two in the present disclosure) inclined surfaces 31f and 31e separated in the radial direction. In the inclined surfaces 31f and 31e, the inclined surface 31e is disposed on the outermost peripheral side, and the inclined surface 31f is disposed radially inside from the inclined surface 31e.

The inclined surfaces 31f and 31e are inclined with respect to the flat surface 30b from an end portion 31A on the other side of the support surface 31 in the circumferential direction toward one side in the first direction described above (toward directions indicated by arrows indicated by reference numerals L5 and L6 in FIG. 11).

As shown in FIG. 12, inclination angles θ5 and θ6 of the inclined surfaces 31f and 31e with respect to the flat surface 30b become shallower (smaller) in order toward the outside in the radial direction of the insertion hole 30a. That is, the inclination angle θ5 of the inclined surface 31e disposed on the outermost peripheral side is shallower (smaller), and the inclined angle θ6 of the inclined surface 31f disposed on an inner peripheral side of the inclined surface 31e is deeper (larger). The inclination angles θ5 and θ6 may be set within the range of the initial inclination angle θ of the inclined portion 12 of the top foil piece 11 shown in FIG. 4, and may be set to values obtained by dividing the initial inclination angle θ into two equal portions, for example.

As shown in FIG. 11, one step 32 is formed between the inclined surfaces 31f and 31e adjacent to each other in the radial direction. The step 32 is formed in an arc shape forming a portion of a concentric circle with the insertion hole 30a. Further, the step 32 of the present disclosure extends from the end portion 31A on the other side of the support surface 31 in the circumferential direction to the end portion 31B on the one side of the support surface 31 in the circumferential direction. In the present disclosure, the step 32 and one of the slits 24 face each other in the axial direction. That is, in three slits 24, there are two slits 24 that do not face the step 32 in the axial direction.

Further, in the second embodiment, the four divided regions 25 of the back foil piece 21 divided in the radial direction by the slit 24 are supported by the two inclined surfaces 31f and 31e divided in the radial direction by the step 32. That is, two of the four divided regions 25 are supported by each of the two inclined surfaces 31f and 31e.

According to the second embodiment having the above configuration, a load capacity of the thrust foil bearing 3 can be improved as in the first embodiment described above. Further, in the second embodiment, as compared with the first embodiment described above, tilt processing of the support surface 31 is simplified, and thus, the base plate 30 can be easily produced.

Third Embodiment

Next, a third embodiment of the present disclosure will be described. In the following description, the same or equivalent configurations as those in the above-described embodiment are designated by the same reference numerals, and descriptions thereof will be simplified or omitted.

FIG. 13 is an enlarged plan view showing a support surface 31 of a base plate 30 according to the third embodiment of the present disclosure.

As shown in FIG. 13, the third embodiment is different from the above embodiments in that the radial positions of the step 32 of the support surface 31 and the slit 24 of the back foil piece 21 do not match with each other.

In the third embodiment, the four divided regions 25 of the back foil piece 21 radially divided by the slit 24 are supported by the four inclined surfaces 31a to 31d radially divided by the step 32. However, the inner end edge 25a of the divided region 25 extends radially inward from a step 32 on a radial inner end edge side of the inclined surface (for example, the inclined surface 31a) supporting the divided region 25.

That is, the inner end edge 25a of the divided region 5 supported by the inclined surface (for example, the inclined surface 31a) having a shallow inclination angle overhangs on the inclined surface (for example, the inclined surface 31b) having a deep inclination angle like an eaves. Therefore, when the radial dimension of one inclined surface (for example, the inclined surface 31a) and the radial dimension of one divided region 25 supported by the inclined surface are represented by W1 and W2, there may be a case where a relationship of W1<W2 is satisfied.

Even with the above configuration, the plurality of divided regions 25 of the back foil piece 21 can be satisfactorily placed on the plurality of inclined surfaces 31a to 31d having different inclination angles, and the plurality of divided regions 25 can be independently deformed by the slit 24.

Although embodiments of the present disclosure have been described above with reference to the drawings, the present disclosure is not limited to the above embodiments. The various shapes and combinations of constituent members shown in the above-described embodiments are examples, and can be variously changed based on design requirements or the like within a scope of the present disclosure defined in claims described below.

INDUSTRIAL APPLICABILITY

According to a thrust foil bearing and a method for manufacturing a base plate of a thrust foil bearing of the present disclosure, a load capacity of the thrust foil bearing can be improved.

What is claimed is:

1. A thrust foil bearing comprising:
a base plate including an insertion hole through which a shaft is inserted and a support surface disposed around the insertion hole on a first side of the base plate in an axial direction; and
a back foil supported by the support surface,
wherein the support surface has a plurality of inclined surfaces of which inclination angles inclined toward a second side of the base plate in the axial direction become shallower in order toward an outside of the insertion hole in a radial direction, and
the back foil is divided into a plurality of divided regions in the radial direction by a slit, and the plurality of divided regions are supported by the plurality of inclined surfaces.

2. The thrust foil bearing according to claim 1,
wherein the plurality of inclined surfaces are adjacent to each other in the radial direction and a step is formed between the adjacent inclined surfaces.

3. The thrust foil bearing according to claim 2,
wherein the slit is formed at a same radial position of the step.

4. The thrust foil bearing according to claim 2,
wherein an inner end edge of at least one of the plurality of divided regions in the radial direction extends further inward in the radial direction than the step on an inner end edge side of the inclined surface supporting the divided region in the radial direction.

5. A method for manufacturing a base plate of a thrust foil bearing including an insertion hole through which a shaft is inserted, a flat surface extending in a direction orthogonal to an axial direction of the insertion hole, and a plurality of inclined surfaces of which inclination angles with respect to the flat surface become shallower in order toward an outside of the insertion hole in a radial direction, the method comprising:
forming the plurality of inclined surfaces by press working.

6. The method for manufacturing a base plate of a thrust foil bearing according to claim 5,
wherein in the press working, the plurality of inclined surfaces are formed by using a plurality of dies having inclination angles corresponding to the plurality of inclined surfaces.

* * * * *